(12) United States Patent
Huck et al.

(10) Patent No.: US 12,675,973 B2
(45) Date of Patent: Jul. 7, 2026

(54) CONTENT MATCHING TOOL FOR VIDEO STREAMING

(71) Applicant: Disney Enterprises, Inc., Burbank, CA (US)

(72) Inventors: Lori Huck, Los Angeles, CA (US); Melissa Mirch, Los Angeles, CA (US); Scott Morehead, Pagosa Springs, CO (US); Mara Lucien, Los Angeles, CA (US); Alexander Niedt, Lomo Linda, CA (US)

(73) Assignee: Disney Enterprises, Inc., Burbank, CA (US)

( * ) Notice: Subject to any disclaimer, the term of this patent is extended or adjusted under 35 U.S.C. 154(b) by 435 days.

(21) Appl. No.: 18/458,637

(22) Filed: Aug. 30, 2023

(65) Prior Publication Data

US 2025/0078451 A1     Mar. 6, 2025

(51) Int. Cl.
*G06V 10/74*        (2022.01)
*G06V 20/70*        (2022.01)

(52) U.S. Cl.
CPC ............ *G06V 10/761* (2022.01); *G06V 20/70* (2022.01)

(58) Field of Classification Search
CPC ...... G06V 10/761; G06V 20/70; G06V 20/41; G06V 20/44; G06V 20/454; G06V 20/464; G06V 20/46; G06V 20/49; G06V 20/635; G06V 20/762; G06V 20/764; G06V 2201/10; H04N 21/23418; H04N 21/23424; H04N 21/25891; H04N 21/812;

(Continued)

(56) References Cited

U.S. PATENT DOCUMENTS 8,266,115 B1 *  9/2012  Park ...................... G06F 16/907
                                                                707/749
9,473,828 B2    10/2016  Wang et al.
(Continued)

FOREIGN PATENT DOCUMENTS

CN        100485574 C   *  5/2009  ............. G06Q 50/10
EP          3133820 A1  *  2/2017  ......... H04N 21/2665

OTHER PUBLICATIONS

"Contextual Ad Breaks for Better Ad Placement," https://www.vionlabs.com/contextual-ad-breaks, 7 pages, printed on May 11, 2023.

(Continued)

*Primary Examiner* — Jose L Couso
(74) *Attorney, Agent, or Firm* — Kwan & Olynick LLP

(57)        ABSTRACT

In some embodiments, a method selects first content and second content. The first content and the second content are configured to be delivered to clients. First labels are determined for categories for the first content. The first labels are based on an analysis of the first content. Second labels are determined for the categories for the second content. The second labels are based on an analysis of the second content. The method compares the first labels and the second labels to determine scores for the first labels. The scores is based on parameters of a matching tool that is configured to determine a match between instances of content. A weight of a category is used to adjust a score in the scores to generate an adjusted score. The score is for the label that is determined for the category. The method outputs information for the adjusted score and other scores.

20 Claims, 9 Drawing Sheets

100—

(58) Field of Classification Search
  CPC ............. H04N 21/2407; H04N 21/252; H04N
                21/6582; H04N 21/84; H04N 21/262;
                H04N 21/266; H04N 21/23109; H04N
                21/2353; H04N 21/251; G06Q 30/02;
                G06Q 30/0205; G06Q 30/0269; G06Q
                30/0242; G06Q 30/0254; G06Q 30/0255;
                G06Q 30/0256; G06Q 30/0276; G06Q
                30/0277; G06Q 50/01; G06Q 50/10;
                G06F 16/583; G06F 18/22; G06F 18/23;
                G06F 18/2413; G06F 16/48; G06F
                16/483
  See application file for complete search history.

(56)                References Cited

U.S. PATENT DOCUMENTS

| | | | |
|---|---|---|---|
| 10,176,198 B1 * | 1/2019 | Dhua ................... | G06V 10/761 |
| 11,223,864 B1 | 1/2022 | Malik et al. | |
| 11,336,930 B1 | 5/2022 | Gupta et al. | |
| 11,501,334 B2 | 11/2022 | Yu | |
| 11,610,223 B2 | 3/2023 | Pradeep et al. | |
| 2009/0037262 A1 | 2/2009 | Patil | |
| 2012/0158743 A1 * | 6/2012 | Gardner ................. | G06F 16/48 |
| | | | 707/E17.084 |
| 2014/0281856 A1 * | 9/2014 | Byrne .................... | G06F 40/30 |
| | | | 715/205 |
| 2016/0062995 A1 * | 3/2016 | Ng ........................ | G06F 16/435 |
| | | | 707/723 |
| 2019/0236629 A1 * | 8/2019 | Higbie .............. | G06Q 30/0206 |
| 2020/0204838 A1 | 6/2020 | Badawiyeh et al. | |

OTHER PUBLICATIONS

"How Smart Campaigns Work," https://support.google.com/google-ads/answer/7652860?hl=en, printed on Aug. 28, 2023, 2 pages.
"Inserting ad breaks into video content using Amazon Rekognition, AWS Elemental MediaConvert and AWS Elemental MediaTailor," https://aws.amazon.com/blogs/media/inserting-ad-breaks-into-video-content-using-amazon-rekognition-aws-elemental-mediaconvert-and-aws-elemenet, printed from website on May 11, 2023, 14 pages.

* cited by examiner

Catalog Content Metadata
Extraction

Receive instance of catalog content — 302

Determine at least a portion of the catalog
content — 304

Extract metadata for metadata categories
and associated labels for the portion of
catalog content — 306

Another portion? — 308

Yes

No

Store the labels for the metadata
categories for the portions of catalog
content — 310

600

| Supp. Content | Catalog Content | Genre | Mood | Activity and Events | Shot Veloctiy | Color Palette | Total |
|---|---|---|---|---|---|---|---|
| Supp. Content #1 | | | | | | | |
| | | Comedy | Whimsical | Family meal | Medium | Brown | Overall Score |
| | Catalog Content #1 | 3 | 3 | 2 | 5 | 3 | 16 |
| | Catalog Content #2 | 4 | 5 | 5 | 5 | 3 | 22 |
| | Catalog Content #3 | 4 | 4 | 5 | 5 | 4 | 22 |
| | Catalog Content #4 | 0 | 0 | 3 | 5 | 2 | 10 |
| | Catalog Content #5 | 0 | 0 | 2 | 4 | 4 | 10 |

Feedback Processing Method

Insert an instance of supplemental content
in an instance of catalog content —802

Receive feedback for the insertion of the
instance of supplemental content —804

Evaluate the feedback —806

Refine parameters of content matching
tool based on the feedback —808

CONTENT MATCHING TOOL FOR VIDEO STREAMING

BACKGROUND

A system may compare metadata for two instances of content to determine if the two instances match. For example, a company may have instances of catalog content, such as videos, that may be delivered to client devices. A system may be used to match instances of supplemental content with instances of catalog content. The system may use a manual selection of information about the instances of catalog content and the instances of supplemental content to perform the comparison. The manual selection may involve inputting keywords that describe the content, demographics (e.g., age ranges) for the content, etc. Using the manual selection may provide obvious matches between content, but these obvious matches may not always be the optimal matches. For example, an instance of catalog content may be manually tagged as with the age range of 21-30 and an instance of supplemental content that is matched with the instance of catalog content may also be manually tagged as being associated with the same age range. This is an obvious match between two general labels. However, there may be other instances of supplemental content that could be explored as being more optimal matches.

BRIEF DESCRIPTION OF THE DRAWINGS

The included drawings are for illustrative purposes and serve only to provide examples of possible structures and operations for the disclosed inventive systems, apparatus, methods and computer program products. These drawings in no way limit any changes in form and detail that may be made by one skilled in the art without departing from the spirit and scope of the disclosed implementations.

FIG. 2 depicts a more detailed example of a content matching tool according to some embodiments.

FIG. 6 depicts a table showing an example of scores according to some embodiments.

DETAILED DESCRIPTION

Figure 1:
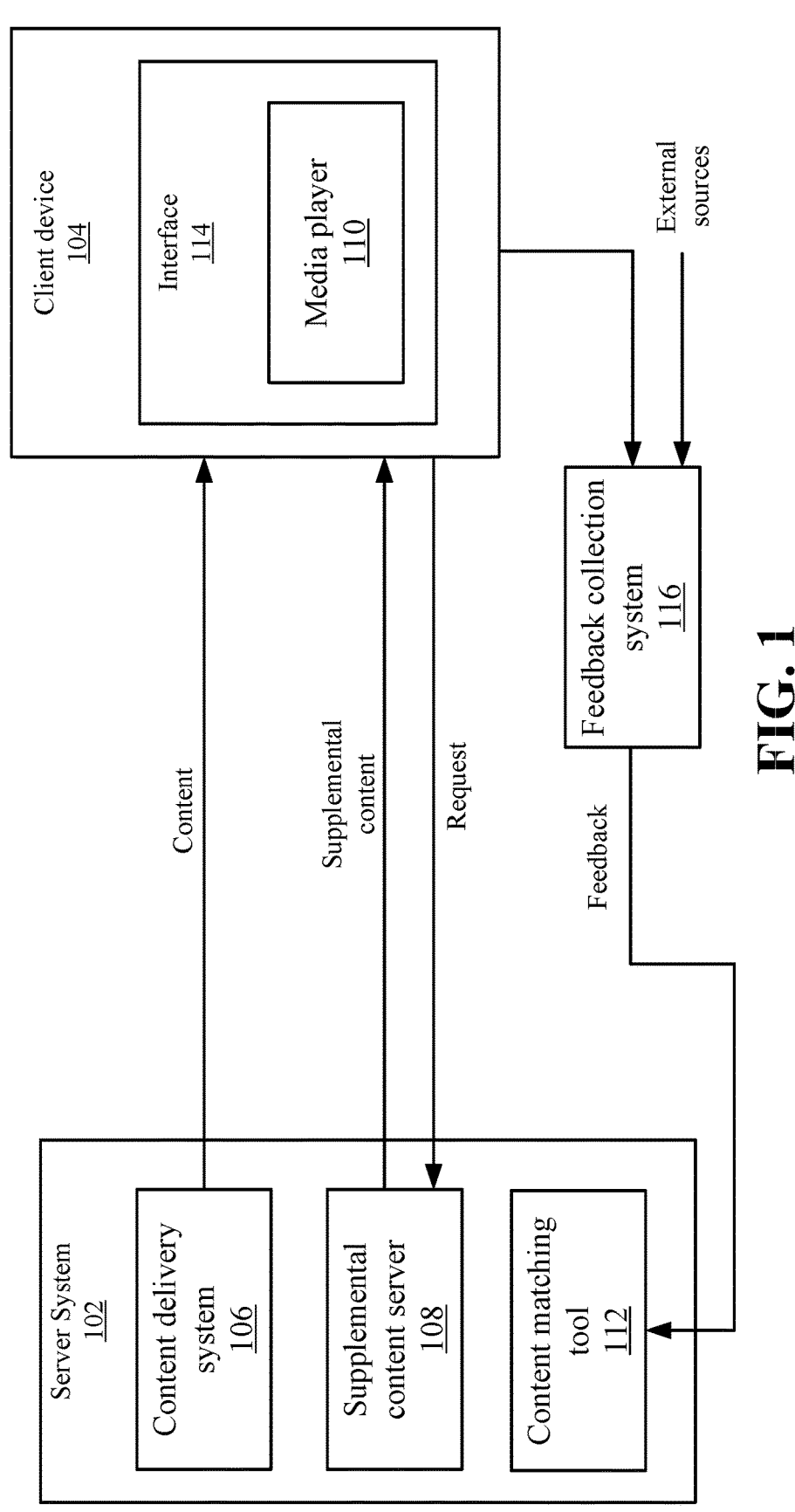
FIG. 1 depicts a simplified system for performing content matching according to some embodiments.

Described herein are techniques for a content analysis system. In the following description, for purposes of explanation, numerous examples and specific details are set forth to provide a thorough understanding of some embodiments. Some embodiments as defined by the claims may include some or all the features in these examples alone or in combination with other features described below, and may further include modifications and equivalents of the features and concepts described herein.

System Overview

A system analyzes content to determine metadata about the content. In some embodiments, two different sets of content, which may be referred to as catalog content and supplemental content, may be analyzed. In some embodiments, the catalog content may be offered for delivery to clients, such as based on a request from user accounts. The supplemental content may be inserted during the playback of the catalog content. The supplemental content and the catalog content may be used in other ways, such as being displayed on a webpage together. Although catalog content and supplemental content are described, other types of content may be used. Generally, two instances of content may be compared. When the term "content" is used, the term may refer to supplemental content or catalog content. Also, an instance of catalog content or supplemental content may refer to a specific file of content, such as a movie, show, episode, advertisement, images, text, audio (e.g., podcasts, audio books, etc.), etc.

The metadata that is used may include robust examples of metadata that may describe characteristics of content found in the instances of content. For example, metadata categories and associated labels may offer granular descriptions of characteristics of the respective instances of catalog content or supplemental content. Some examples of metadata categories include genre, mood, activity and event, shot velocity, color palette, music, etc. Each category may have associated labels that can be assigned to instances of supplemental content or catalog content. The categories and labels will be described in more detail below. In some embodiments, the system may extract the metadata based on portions of an instance of catalog content, such as at the shot level, scene level, or other portions may be used.

Using the enhanced metadata, a content matching tool may compare metadata for instances of supplemental content and catalog content to determine scores for instances of supplemental content and catalog content. For example, for an instance of supplemental content, the content matching tool may analyze metadata to output scores to indicate whether instances of catalog content match the instance(s) of supplemental content. In some embodiments, the system may want to determine instances of catalog content that have similar (or contrasting) content to an instance of supplemental content. A similar match may have matching themes (e.g., both have a fast shot velocity) whereas a contrasting match may have contrasting themes (e.g., a fast shot velocity and a slow shot velocity). The discussion may describe similar matches in examples, but contrasting matches may also be appreciated in addition to other types of matches. In some examples, an instance of supplemental content may have the labels and scores of Genre: Comedy –0; Mood: Whimsical; –0 Activity and Events: Family meal –2; Shot Velocity: Medium –4; and Color Palette: Brown –4. The scores for the labels are determined based on a comparison to metadata for an instance of catalog content. For example, the scores may indicate a low match of "0" for the comedy and whimsical labels and a high match of "4" for the medium and brown labels when a range of 0-5 is being used. In this example, the overall score may be "10", which is a combination of the scores for the labels.

The determination of instances of catalog content with similarity to an instance of supplemental content may be important because the system may insert the instance of supplemental content into a break during playback of the instances of catalog content. Finding a good match with similarity between the instance of supplemental content and instances of catalog content may be important to improving a streaming experience. For example, inserting an instance of supplemental content that is a good match to an instance of catalog content may improve a viewing experience for a viewer.

The matches that are provided may be based on different combinations of metadata. For example, a movie including an actress with a fast shot velocity may match with supplemental content that includes the same actress and a similar shot velocity. Also, an instance of catalog content that has a scene in a library may be matched with supplemental content that also has a location in a library. The use of more robust metadata may improve the analysis process. For example, the robust metadata may allow the exploration of different matches between instances of supplemental content and catalog content beyond simple manually inputted keywords. Also, less obvious matches may be generated with different combinations of metadata.

The system also includes a feedback loop that allows the content matching tool to continuously learn and generate improved content matches. For example, feedback may be based on engagement with an instance of supplemental content, such as when the instance of supplemental content is inserted in a break during playback of an instance of catalog content. Depending on if the engagement is considered positive or negative, the content matching tool may adjust parameters that are used to determine future matches. For example, a positive engagement with labels of similar shot velocity may result in parameters being adjusted to score instances of supplemental content and instances of catalog content with similar shot velocity higher. Also, weights for categories may be adjusted based on the feedback. The adjusting in weights may make certain categories influence the overall score more, such as the score of "4" for the brown color palette may be weighted higher, and the score is increased to 6. Also, the feedback may allow the content matching tool to explore different possibilities of matches and find non-obvious matches. For example, inserting an instance of supplemental content in an instance of catalog content that has contrasting metadata may result in positive feedback. This may be a match that may not have been found without using the robust metadata, scores, and feedback. Accordingly, the feedback may allow the content matching tool to explore and promote matches in multiple different combinations of metadata between catalog content and supplemental content.

System

FIG. 1 depicts a simplified system 100 for performing content matching according to some embodiments. System 100 includes a server system 102 and a client device 104. Although a single instance of server system 102 and client device 104 are shown, multiple instances will be appreciated. For instance, server system 102 may include multiple servers or other computing devices to provide the functionality described herein. Also, system 100 may include multiple client devices 104 that interact with server system 102.

Server system 102 may include a content delivery system 106 that delivers content (e.g., videos, audio, etc.) to client devices 104. In some embodiments, content delivery system 106 may use a content delivery network (CDN) (not shown) to deliver the content. The content may be associated with catalog content, which may be content that is requested by a user account associated with client device 104. For example, a user account may request a movie, an episode of a show, etc. Although videos are described herein, it will be understood that other content may also be delivered, such as a website, page of content, images, text, audio (e.g., podcasts, audio books, etc.), etc.

Client device 104 may be a computing device, such as a smartphone, living room device, personal computer, tablet, television, set-top box, etc. Client device 104 may include an interface 114 that may display the catalog content, such as videos. For example, a media player 110 may playback a video that is requested from content delivery system 106. A user account may use client device 104 and may be associated with a service (e.g., the user account signs up for the service). Also, the service may store characteristics for the user account, such as an age of a user, watch history, etc.

In some embodiments, catalog content may be a library of content that is offered by the service that uses content delivery system 106. Client devices 104 may request playback of an instance of catalog content. Supplemental content may be different from the catalog content, such as the supplemental content may not have been originally requested by client device 104 as compared to the request for the catalog content. An example of an instance of supplemental content may be an advertisement that is displayed during a break in the instances of catalog content. Supplemental content server 108 may detect when supplemental content should be displayed. For example, during the delivery of an instance of catalog content, a break may occur in which one or more instances of supplemental content should be displayed. In other embodiments, an instance of supplemental content may be displayed on a site, such as a web page, simultaneously with the instance of catalog content that client device 104 is displaying. It will be understood that supplemental content may be displayed in different scenarios.

In some embodiments, supplemental content server 108 may communicate with other devices or modules to determine the instance of supplemental content to display. For example, supplemental content server 108 may receive a list of instances of supplemental content that are eligible to be displayed during a break. The list may be based on different factors, such as targeting rules that match the characteristics of the user account or may be any instances of supplemental content that are available for that break. The targeting rules may be based on targeting characteristics, such as age, gender, location, device type, etc. When the instance of supplemental content is selected, server system 102 sends an instance of supplemental content to client device 104. The selection of instances of supplemental content using targeting rules may be different from the selection of instances of catalog content that match an instance of supplemental content using content matching tool 112 as described herein. Client device 104 may then display the instance of supplemental content. The display of the instance of supplemental content may form an impression, which is when an instance of supplemental content is displayed to the user account. The user account may also engage with the instance of supplemental content, such as by inputting a selection of the instance of supplemental content (e.g., to display another site), inputting feedback (e.g., positive or negative), etc. For example, inputting feedback may involve receiving a thumbs up or thumbs down rating from a user, a rating within a range, etc. for the instance of supplemental content that may indicate the opinion of relevancy from a user account.

A content matching tool 112 may compare instances of catalog content to one or more instances of supplemental content to determine matches between the one or more instances of supplemental content and the instances of catalog content. A match may be where scores that are generated based on comparisons of instances of catalog content to an instance of supplemental content meet a threshold. Content matching tool 112 may then output the matches. As will be discussed in more detail below, content matching tool 112 uses granular metadata that is extracted from instances of catalog content and instances of supplemental content to perform the comparison to determine matches. Content matching tool 112 may apply weights to metadata categories which may increase/decrease categorical scores for more granular and improved matches. The weights may apply to categories based on an importance of the respective category.

A feedback collection system 116 may analyze the engagement of client device or the user account with the instance of supplemental content that is displayed. The engagement may be based on different factors, such as the selection of the instance of supplemental content, viewing the instance of supplemental content, buying a product that is associated with the instance of supplemental content, explicit feedback, etc. The feedback may be received from client device 104, such as when a selection of the instance of supplemental content is received. The feedback may also be received from external sources to the delivery system, such as when feedback from a website that is associated with the instance of supplemental content is received. Feedback collection system 116 may provide the feedback back to content matching tool 112. Content matching tool 112 may use a feedback process to adjust parameters (e.g., weights) that are used to perform the analysis to determine matches. The following will now describe the content matching process in more detail.

Content Matching Tool

Figure 2:
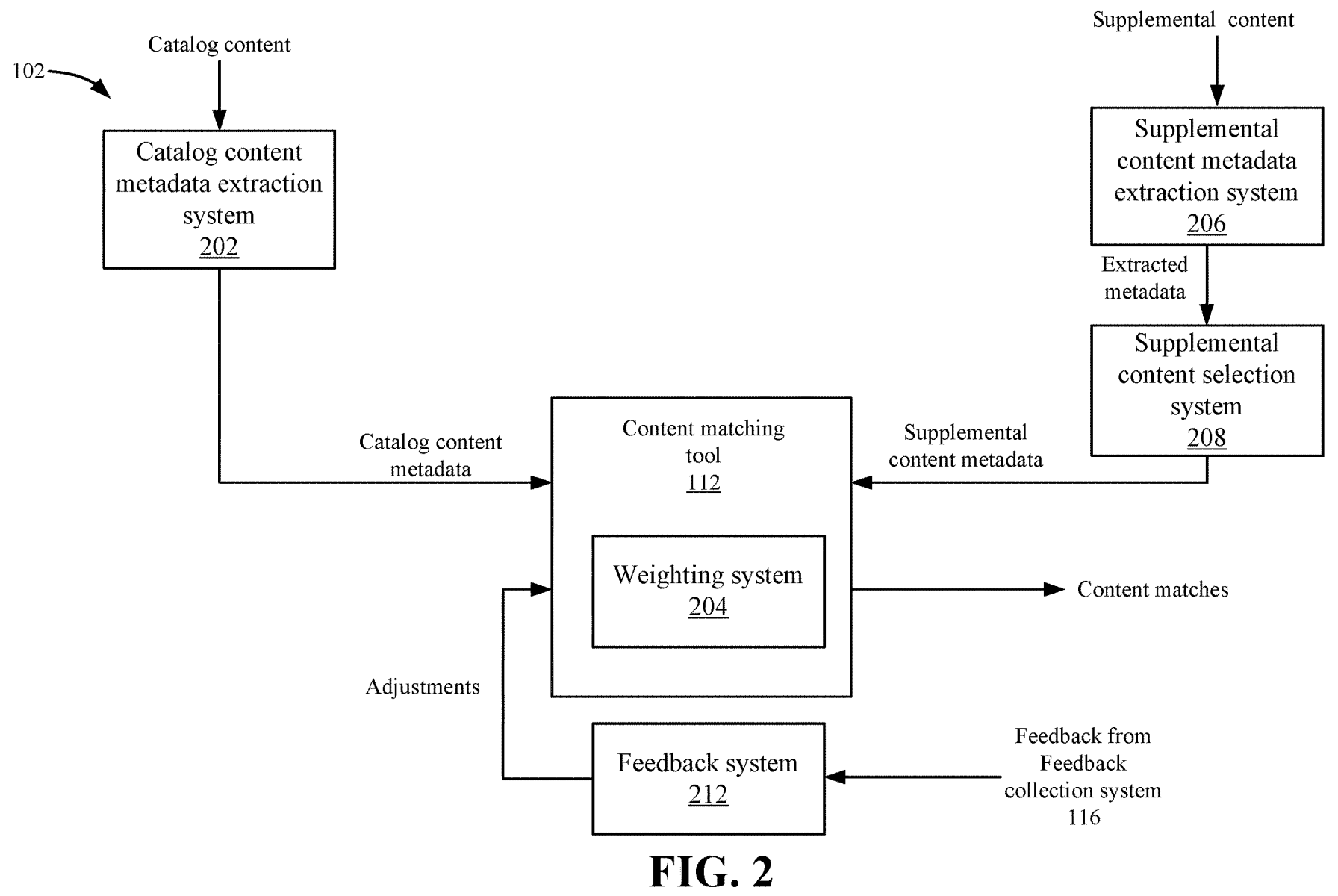

FIG. 2 depicts a more detailed example of content matching tool 112 according to some embodiments. A catalog content metadata extraction system 202 may receive instances of catalog content and extract metadata from the instances of catalog content. Examples of catalog content may include movies, shows, shorts, sports, images, audio, podcasts, talent, sports figures, brands, etc. Catalog content metadata extraction system 202 may extract metadata for each instance of catalog content.

Catalog content metadata extraction system 202 may extract metadata by analyzing the content of different portions of an instance of catalog content. For example, the portion of content may include the shot level or scene level in an instance of catalog content. A shot may be based on a continuous capture of content from one camera angle. A scene may be based on the analysis of content where a singular theme includes a sequence of related shots that may take place in a similar space and time. Different methods to detect the portions of video, such as the shots or scenes may be used. Also, catalog content metadata extraction system 202 may extract metadata for the instance of content at the instance level, which may be based on the entire instance of content. In some embodiments, the extraction of metadata for these categories may be performed by a human or by machine learning.

Examples of metadata that can be extracted include the categories of genres, mood, activities and events, shot velocity, color palette, and qualities of music/score. Other categories may also be appreciated. Within each metadata category or metadata group, different labels may be used. For example, the genre category may include the labels of action-adventure, musical, comedy, animals and nature, etc. The labels for the genre category may be based on a detected genre in the content. For example, catalog content metadata extraction system 202 may analyze characters or settings to determine the genre. The labels may be tagged at a portion level or the instance level or the portion level and the instance level. For example, the instance of content may be tagged with one of the labels for the genre category, which may mean the entire instance of catalog content is associated with the label. However, an instance of catalog content may be tagged at a portion level, such as at the scene level, which may mean the scene is associated with the label. For example, the mood for an instance of content may be happy, and the mood at the scene level may be sad for a portion of the content. The labels and categories described herein may be tagged at the instance level or content portion level.

The mood category may include labels such as wild, dramatic, wondrous, romantic, etc. The mood category may detect a mood of the content that is analyzed based on dialog, facial recognition, audio, music, score, etc.

The activities and events category may include the labels of driving, kissing, eating, drinking, crying, birthdays, first day of school, holidays, etc. The labels in the activities and events category may describe an activity or an event that is detected during the content that is analyzed.

The shot velocity category may include labels based on the measurement of the motion of the content in the portion of content. Labels may include a low, medium, and high shot velocity.

The color palette category may include labels based on the color detected in the content. The labels for the colors, such as red, blue, gray, as well as additional categories such as hues, saturation, tones, intensity, chromacity, etc. that may be associated with the colors.

The qualities of music/score may include labels based on the audio detected in the portion of content. Some labels include genre, tempo, dynamics, and overall loudness, etc.

Supplemental content metadata extraction system 206 may receive an instance of supplemental content and extract metadata for the instance of supplemental content. In some embodiments, supplemental content metadata extraction system 206 may extract metadata for an instance of supplemental content at the instance level. For example, instances of supplemental content may be shorter and focused on one theme compared to catalog content (e.g., a short clip for supplemental content versus a movie for catalog content). Thus, splitting an instance of supplemental content into portions may not be needed. However, supplemental content metadata extraction system 206 could split supplemental content into portions and extract metadata for each of the portions. The portions may be determined similarly to catalog content.

Supplemental content metadata extraction system 206 may extract metadata using the same categories as described with respect to the catalog content. In other embodiments, different metadata categories may be used for catalog content and supplemental content Also, if different metadata categories have the same metadata label, such as color, then the color from one metadata category may be compared to the color of another metadata category. Supplemental content metadata extraction system 206 may determine labels for instances of supplemental content at the instance level. However, supplemental content metadata extraction system 206 could determine labels for portions of an instance of supplemental content. The assigning of labels to instances of supplemental content may be similar to as described with catalog content.

A supplemental content selection system 208 may select instances of supplemental content in which content matching can be performed. In some embodiments, supplemental content selection system 208 may select an instance of supplemental content and determine the extracted metadata for the instance of supplemental content. In some examples, a single instance of supplemental content may be compared to multiple instances of catalog content. In this case, supplemental content metadata for the instance of supplemental content is provided to content matching tool 112. Content matching tool 112 may then determine matches for the instance of supplemental content from instances of catalog content based on respective catalog content metadata. In other embodiments, a single instance of catalog content may be compared to multiple instances of supplemental content, multiple instances of both catalog content and supplemental content may be compared, etc.

A weighting system 204 may weight metadata categories or labels differently. For example, feedback may indicate that some metadata categories may be more important or provide more relevant matches. In some embodiments, the weight of the genre category may be 25% of an overall score and the weight of the mood category may be 5% of the overall score when the genre category is considered more important. Additionally, based on the results, different categories may be weighted differently. For example, the weights may be adjusted to emphasize the four categories and de-emphasize the two categories. The weights may adjust the scores of some labels, such as score for a label may be: Label score=score*weight, which may be 6=4*1.5 if the score is "4" and the weight is "1.5". Also, weights may be adjusted to include more weight to some labels that are determined to provide better matches, or less weight to some labels that may not provide better matches.

Content matching tool 112 may determine matches by comparing supplemental content metadata and catalog content metadata. In a training process, parameters of content matching tool 112 may be trained to analyze labels of the instance of supplemental content and labels of instances of catalog content to determine the scores. Different methods may be used to determine the scores. For example, based on how various types of supplement content perform, changes can be made to the scoring method to prioritize pairings that garner favorable results. In other embodiments, a prediction network is used to receive the labels as input and output the scores for the labels of the instance of supplemental content. Other methods may also be used. For each label of an instance of supplemental content, content matching tool 112 may output scores for instances of catalog content. The scores may indicate a relevancy or probability that an instance of catalog content matches the respective label. Content matching tool 112 may generate an overall score from the category scores and compare the overall scores to thresholds to determine matches. The matching process will be described in more detail below. Then, content matching tool 112 outputs content matches between instances of catalog content and the instance of supplemental content.

A feedback system 212 receives feedback for instances of supplemental content. For example, as discussed above, supplemental content server 108 may insert instances of supplemental content during breaks of delivering catalog content to client 104. Feedback regarding the engagement with the instances of supplemental content may be received from feedback collection system 116, such as whether the instances of supplemental content were selected, watched, etc. during the break. The feedback may be received from disparate sources, such as from the delivery system where the instance of supplemental content is displayed (e.g., the instance of supplemental content is selected) or external to the delivery system (e.g., a website may be engaged with for the instance of supplemental content). Feedback collection system 116 improves the system to aggregate the feedback and communicate with feedback system 212 to change the weights of weighting system 204. Feedback system 212 may then determine adjustments based on the feedback. For example, the adjustments may alter weights in weighting system 204 or other parameters in content matching tool 112 that are used to determine matches. For example, if an instance of supplemental content with a label of "animals and nature" provided positive feedback when matched with an instance of catalog content with a label of "comedy", weights for the genre of activity and event may be increased to increase the contribution to the overall score. Also, parameters of content matching tool 112 may be adjusted to increase the score when instances of supplemental content and catalog content include these two labels. Other feedback may be based on viewing the scores. For example, if two categories have scores of "0" and four categories have higher scores (e.g., "4" or above), then the weights of those categories may be lowered and the weights of the other four categories may be increased. This may result in different matches of content that focus on the four categories.

The following will now discuss the metadata extraction for catalog content and supplemental content in more detail, and then the comparison process.

Catalog Content Metadata Extraction

Figure 3:
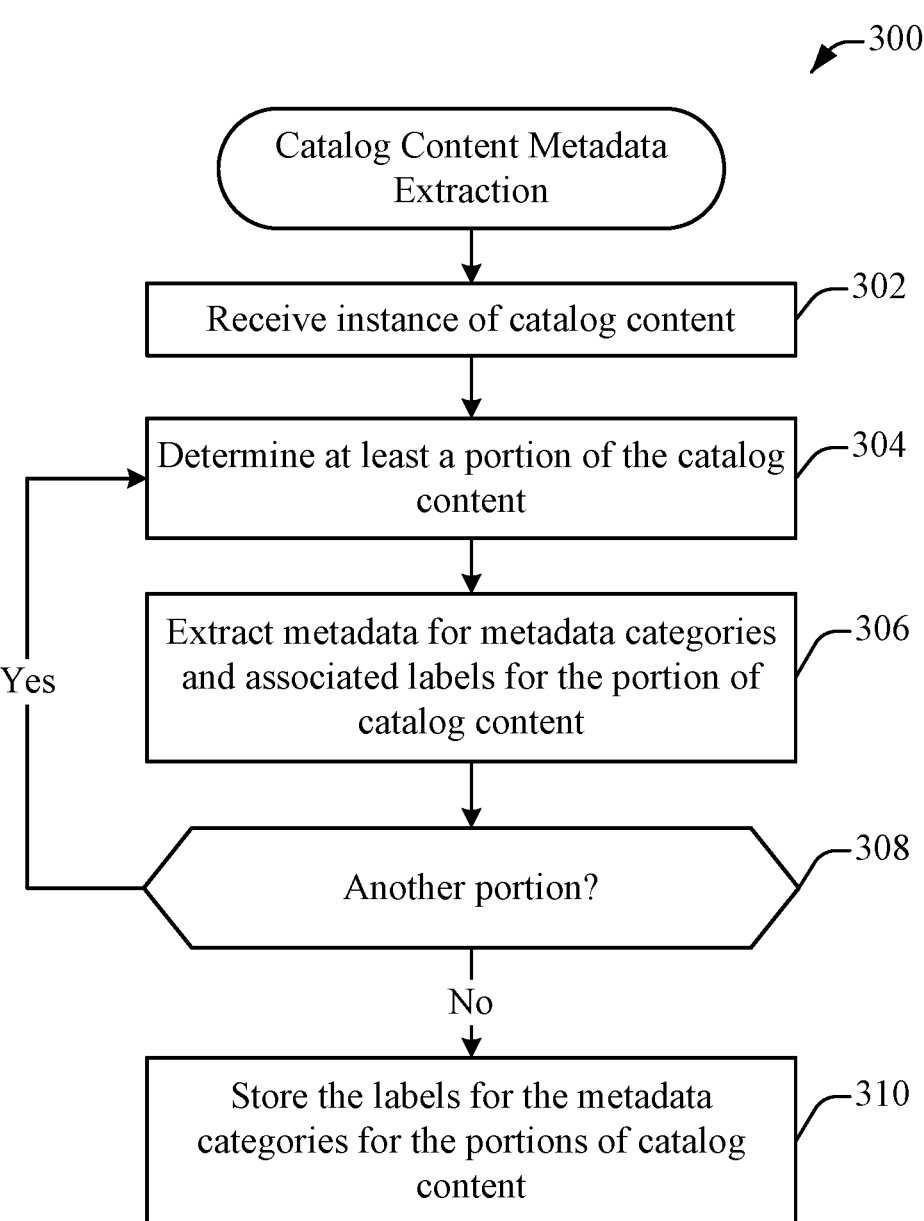
FIG. 3 depicts a simplified flowchart method for extracting metadata for catalog content according to some embodiments.

FIG. 3 depicts a simplified flowchart 300 method for extracting metadata for catalog content according to some embodiments. At 302, catalog content metadata extraction system 202 receives an instance of catalog content. In some embodiments, catalog content metadata extraction system 202 may extract metadata for multiple instances of catalog content. Accordingly, the method described herein may be performed for each instance of catalog content.

At 304, catalog content metadata extraction system 202 determines at least a portion of catalog content. As described above, a portion may be any length of the instance of catalog content, such as a scene, a shot, a segment, or other defined discrete instances of the content.

At 306, catalog content metadata extraction system 202 extracts metadata for metadata categories and associated labels for the portion of catalog content. For example, for each metadata category, catalog content metadata extraction system 202 may determine scores for the different labels based on the analysis of the content. In some embodiments, catalog content metadata extraction system 202 may determine a probability that the portion of catalog content includes the genre labels of action-adventure at 0.02, musical at 0.10, comedy at 0.95, and animals and nature at 0.2. For example, different content analysis tools may be trained to analyze the content and predict the scores for the labels. Then, catalog content metadata extraction system 202 may select one or more of the labels based on the scores, such as by comparing the scores to a threshold and selecting labels that meet the threshold. Also, a highest rated label may be selected. For example, catalog content metadata extraction system 202 may select the comedy label for the genre category based on the comedy label having the highest score of 0.95. Other examples of selecting the labels for metadata categories may be appreciated. For example, scores for all labels may be stored.

At 308, catalog content metadata extraction system 202 determines if there is another portion to analyze. For example, a next scene may be analyzed in the instance of catalog content. If there is another portion, the process reiterates to 304 where another portion of catalog content is determined, and metadata is extracted for the portion. If another portion is not determined, at 310, catalog content metadata extraction system 202 stores the labels for the categories for the portions of content. This may include labels for each portion in addition to labels for the entire instance of catalog content.

Supplemental Content Metadata Extraction

Figure 4:
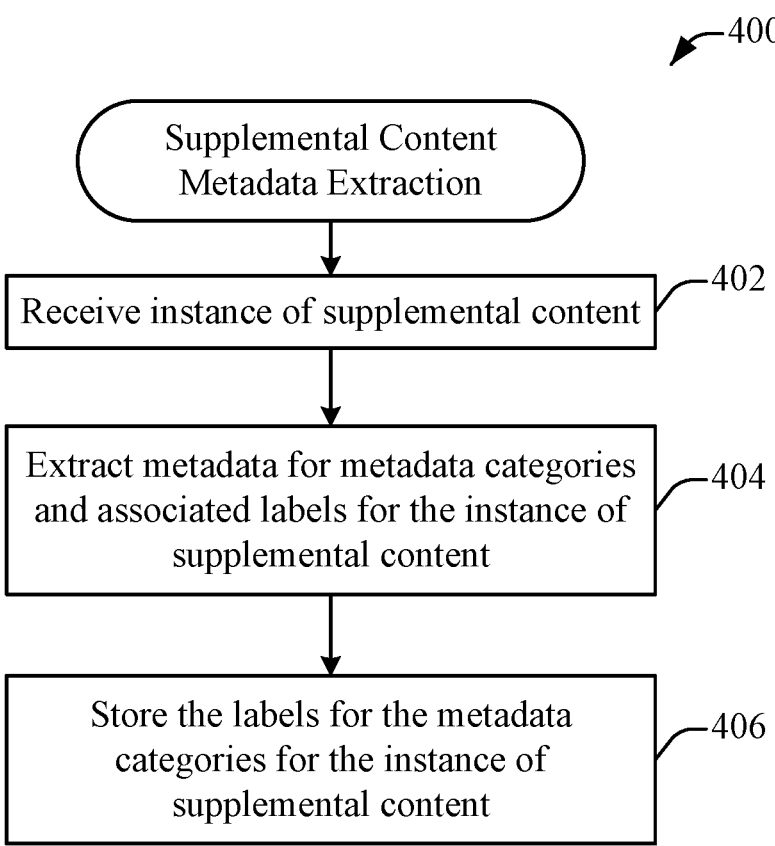
FIG. 4 depicts a simplified flowchart of a method for extracting metadata for supplemental content according to some embodiments.

FIG. 4 depicts a simplified flowchart 400 of a method for extracting metadata for supplemental content according to some embodiments. At 402, supplemental content metadata extraction system 206 receives an instance of supplemental content. Supplemental content metadata extraction system 206 may perform the following process for multiple instances of supplemental content.

At 404, supplemental content metadata extraction system 206 extracts metadata for metadata categories and associated labels for the supplemental content. As discussed above, an instance of supplemental content may be shorter in the length compared to an instance of catalog content and may be focused on a single theme. Thus, the instance of supplemental content may not be segmented into portions, but could be segmented into portions that are individually analyzed. The extraction of labels for metadata categories may be similar to the extraction described above in FIG. 3 for instances of catalog content. Also, different labels for supplemental content may also be used.

At 406, supplemental content metadata extraction system 206 stores the labels for the metadata categories for the instance of supplemental content. In this case, the labels may be associated with the entire instance of supplemental content rather than for portions of the supplemental content.

After extracting the metadata, content matching tool 112 may compare supplemental content with catalog content to determine scores for matching content.

Content Matching

Figure 5:
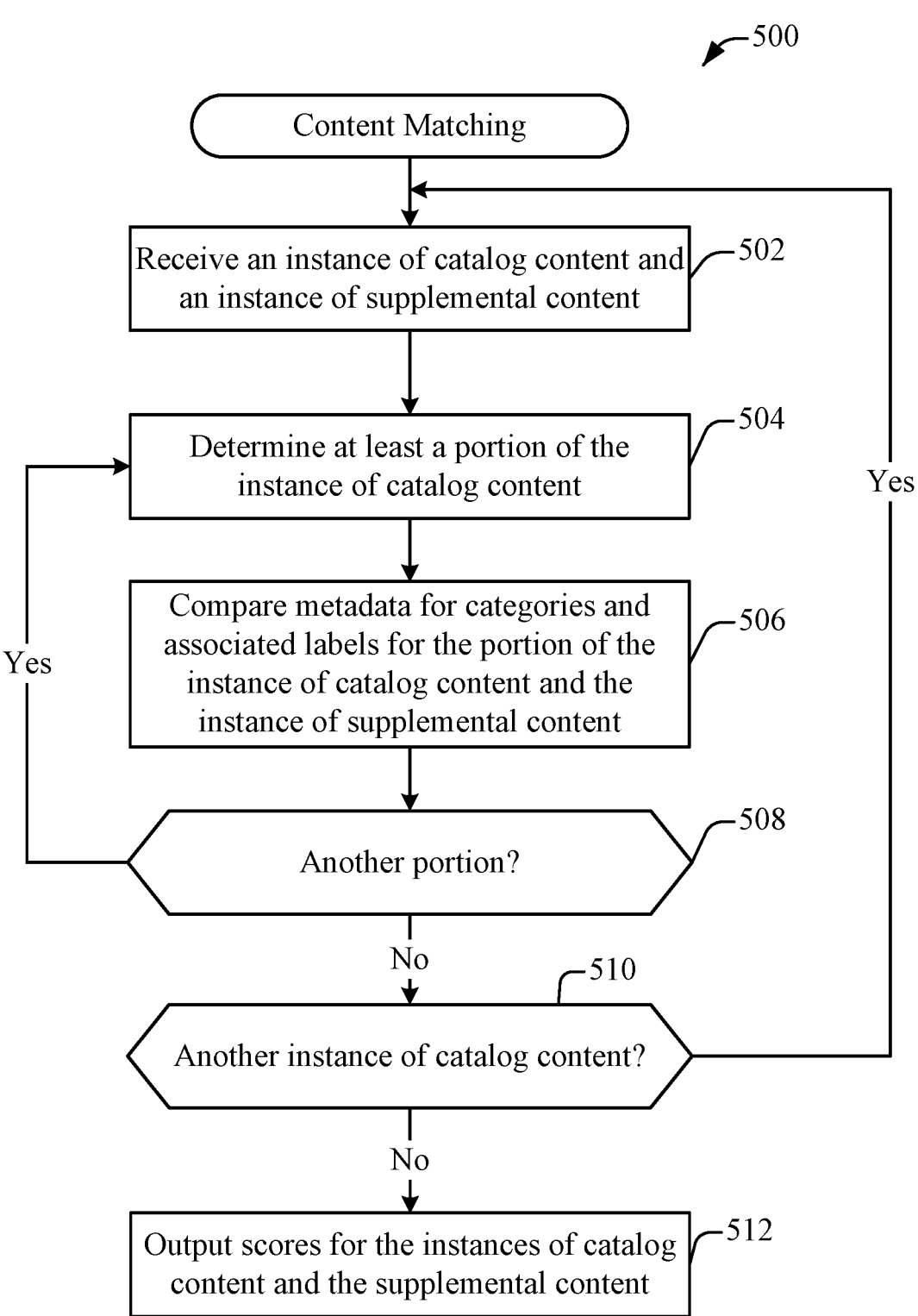
FIG. 5 depicts a simplified flowchart of a method for comparing an instance of supplemental content with an instance of catalog content according to some embodiments.

FIG. 5 depicts a simplified flowchart 500 of a method for comparing an instance of supplemental content with an instance of catalog content according to some embodiments. At 502, content matching tool 112 receives an instance of catalog content and an instance of supplemental content. In some embodiments, content matching tool 112 may compare metadata for an instance of supplemental content to metadata for multiple instances of catalog content to determine scores for matching instances of catalog content to the instance of supplemental content.

At 504, content matching tool 112 may determine at least a portion of the instance of catalog content. Content matching tool 112 may determine scores for portions of the catalog content or for the entire instance of catalog content. The at least a portion may thus be a portion or the entire instance.

At 506, content matching tool 112 compares metadata for categories and associated labels for the portion of the instance of catalog content and the instance of supplemental content. In some embodiments, content matching tool 112 uses the associated labels for the instance of supplemental content and generates scores for the associated labels based on metadata for the portion of catalog content. For example, if the label for the instance of supplemental content is "dramatic", but the label for the portion of the catalog content is "romantic", then parameters for content matching tool 112 may generate a lower score, indicating lower likelihood of a match. However, if both labels are "dramatic", then parameters for content matching tool 112 may generate a higher score, indicating a higher likelihood of a match. The parameters of content matching tool 112 may be trained to determine scores based on different relationships of labels.

Weights may also be used to determine the total score. The weights may be based on the category. For example, a first metadata category may be weighted at 150% and a second metadata category may be weighted at 0%. Then, a score of 3.0 for the label of "dramatic" in the category of mood may have a weight of 150% applied to make the score of 4.5. Then, a score of 4.0 for the label of "musical" for genre may have a 0% weight applied and the score is 0.0. Thus, the score for the dramatic label may be increased to a score of 5.0 and the score for musical may be reduced to 3.0 because of the weights.

After determining the scores based on the comparison, at 508, content matching tool 112 determines if there is another portion of the instance of catalog content to analyze. If so, the process reiterates to 504 to determine another portion of the catalog content and generates scores for the next portion of catalog content and the instance of supplemental content. This reiteration process proceeds until there is no other portion. Then, at 510, content matching tool 112 determines if another instance of catalog content will be analyzed. As described above, multiple instances of catalog content may be analyzed. For example, five instances of catalog content #1 to #5 may be analyzed. The respective total scores for the instances of catalog content may be 16, 22, 22, 10, and 10. A more detailed example will be described in FIG. 6. If there is another instance of catalog content, the process reiterates to 502, where another instance of catalog content is determined, analyzed and scored. The same instance of supplemental content may be used in the comparison.

Once all instances of catalog content had been analyzed, at 512, content matching tool 112 output scores for the instances of catalog content. The scores may be in different formats. In some embodiments, scores for each label of the instance of supplemental content may be provided in addition to an overall score. Examples will be described in more detail below in FIG. 6 and FIG. 7.

FIG. 6 depicts a table showing an example of scores according to some embodiments. Table 600 includes column 602 to 616. Column 602 identifies the instance of supplemental content, which may be referred to as supplemental (supp.) content #1. For example, supplemental content #1 may be a short video. Column 604 identifies the instances of catalog content. Here, five instances of catalog content #1 to #5 were compared to the instance of supplemental content #1, but other numbers of instances of catalog content may be compared.

Column 606 to column 614 list the metadata categories of genre, mood, activity and events, shot velocity, and color palette, but other categories may be used. A column 616 lists the overall score, which may be a combined score that is computed based on values from scores in column 606 to 614.

A row 618 may list the labels for the instance of supplemental content #1. In this example, the labels for column 606 to 614 are comedy, whimsical, family meal, medium, and brown, respectively. As labels for the instances of supplemental content change, the values in row 618 may change.

In rows 620-1 to 620-5, scores for instances of catalog content #1 to #5 are shown, respectively. Each label in columns 606 to 614 receives a score from content matching tool 112 based on the comparison of metadata from the respective instance of catalog content to the label for the instance of supplemental content #1. Although the entire instance of catalog content is shown, scores for multiple portions of a respective instance of catalog content may also be used. In this example, the scores may be in the range of 0-5, with 0 being a lower score and 5 being a higher score, but the scores may be represented in other ways. A higher score may indicate that the instance of catalog content may be a closer match to the instance of supplemental content #1.

The overall score may be the combination of scores from the labels with weights that may be applied to the scores. In some embodiments, the scores for the labels may be added together, but other combinations may be used, such as an average. The respective total scores for the instances of catalog content may be 16, 22, 22, 10, and 10 in rows 620-1 to 620-5, respectively. The instances of catalog content #4 and #5 have the lowest score of 10, the instances of catalog content #2 and #3 have the highest score of 22. The output of these scores may provide information about the instance of supplemental content #1 in relation to the instances of catalog content. For example, if a system or a user would like to determine catalog content that has the highest matching score to the instance of supplemental content, then the highest total scores may be used. Also, the same analysis may be performed using labels. For example, the genre of instances of catalog content may be similar to the genre of comedy of the instance of supplemental content #1. Also, for catalog content #4 and #5, the genre of comedy may not be a good comparison match with the instance of supplemental content #1. The above description describes determining matching content. However, if the system or the user would like to determine contrasting catalog content, then the lowest scores may be used to determine instances of catalog content that contrast with the instance of supplemental content. Also, instead of determining lower scores for contrasting content, content matching tool 112 may be set to find contrasting content. In this case, the higher scores may indicate instances of catalog content that are more contrasting.

Figure 7:
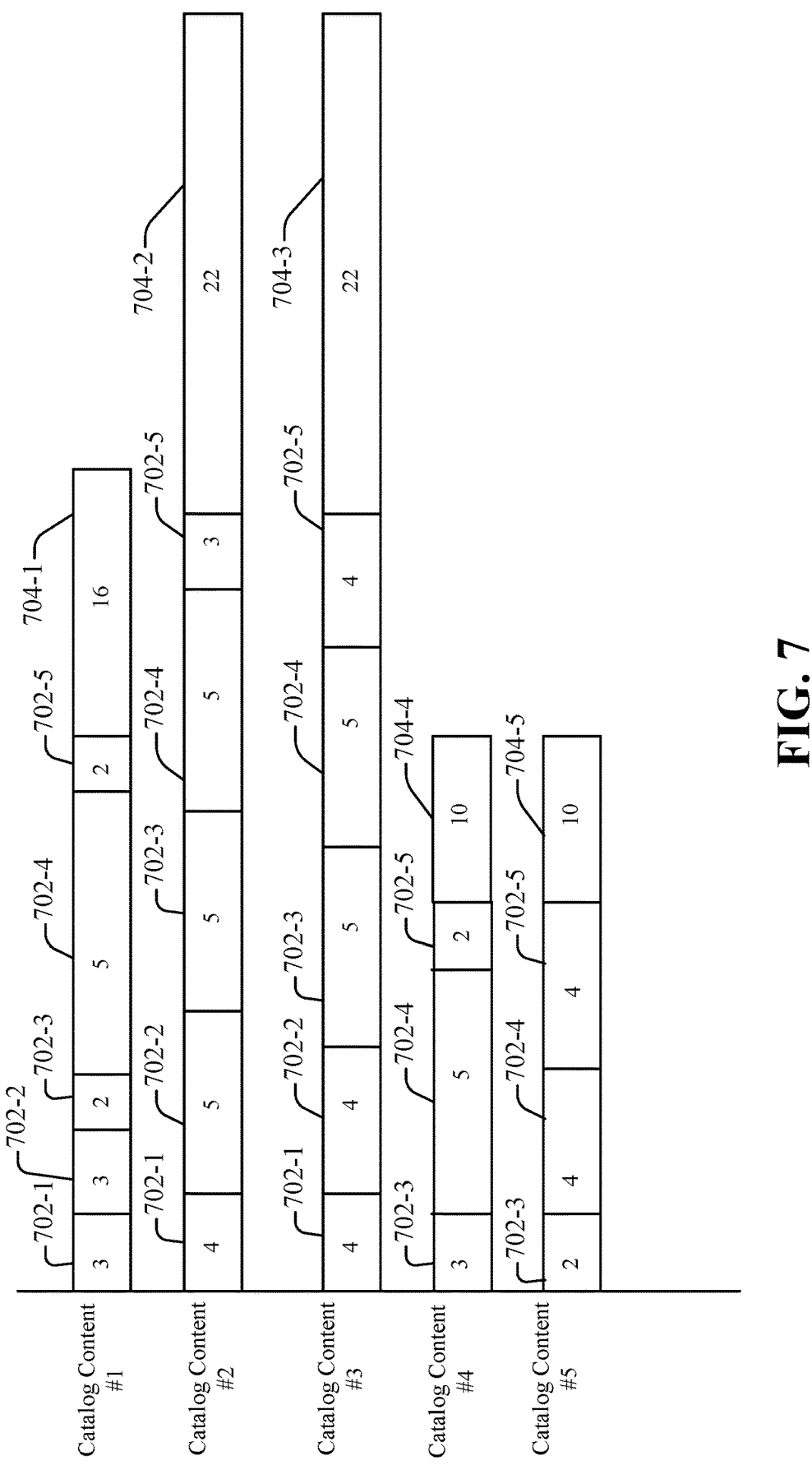
FIG. 7 depicts an example of a bar chart that displays the values of the labels according to some embodiments.

The information from table 600 may be output in a user interface for a user to view. Different variations of the information may be output. For example, table 600 itself may be output. Also, a bar chart may be output that lists the values for the labels and also the total score. FIG. 7 depicts an example of a bar chart that displays the values of the labels according to some embodiments. Here, the five instances of catalog content #1 to #5 from FIG. 6 are shown, but other numbers of instances of catalog content may be compared.

The reference numbers 702-1, 702-2, 702-3, 702-4, and 702-5 list the scores for the respective metadata categories of genre, mood, activity and events, shot velocity, and color palette, but other categories may be used. If a reference number is not included, then the score is zero, such as comedy in the genre Comedy and whimsical in the Mood category had scores of zero for instances of catalog content #4 and #5. Reference numbers 704-1 to 704-5 respectively list the overall score for each instance of catalog content #1 to #5, which may be a combined score that is computed based on values from scores in column 616 in FIG. 6.

A longer bar may indicate a higher score and a shorter bar may indicate a lower score for instances of catalog content. For example, the length of the bar for the instance of catalog content #2 and #3 is longer than the length of the bar for instances of catalog content #1, #4 and #5 because the score of 22 is higher than the scores of 16, 10, and 10, respectively. The length of respective scores for categories can also be observed. For example, the scores for the Color Palette category can be reviewed based on the length of the respective bar at 702-5. Users can view the user interface and determine how an instance of supplemental content might match with instances of catalog content. For example, a user may want to determine if the instance of supplemental content is a good candidate to be inserted into instances of catalog content. Further, portions of catalog content may be scored and portions of catalog content that can be a good match for the instance of supplemental content can be determined.

As described above, the instance of supplemental content may be inserted into catalog content. The criteria for inserting the instance of supplemental content may be different from the labels that are used to determine the matches. For example, supplemental content server 108 may have rules, such as pacing rules, targeting rules, etc. that are used to select instances of supplemental content. However, in some embodiments, the scores may also be used to insert instances of supplemental content. For example, when a portion of an instance of catalog content is played before a break, an instance of supplemental content that has a high score for the portion may be selected or the score may be used in the selection process with the other criteria.

After inserting instances of supplemental content into catalog content, feedback may be received. The following describes a method for using feedback to adjust parameters of content matching tool 112.

Feedback Processing

Figure 8:
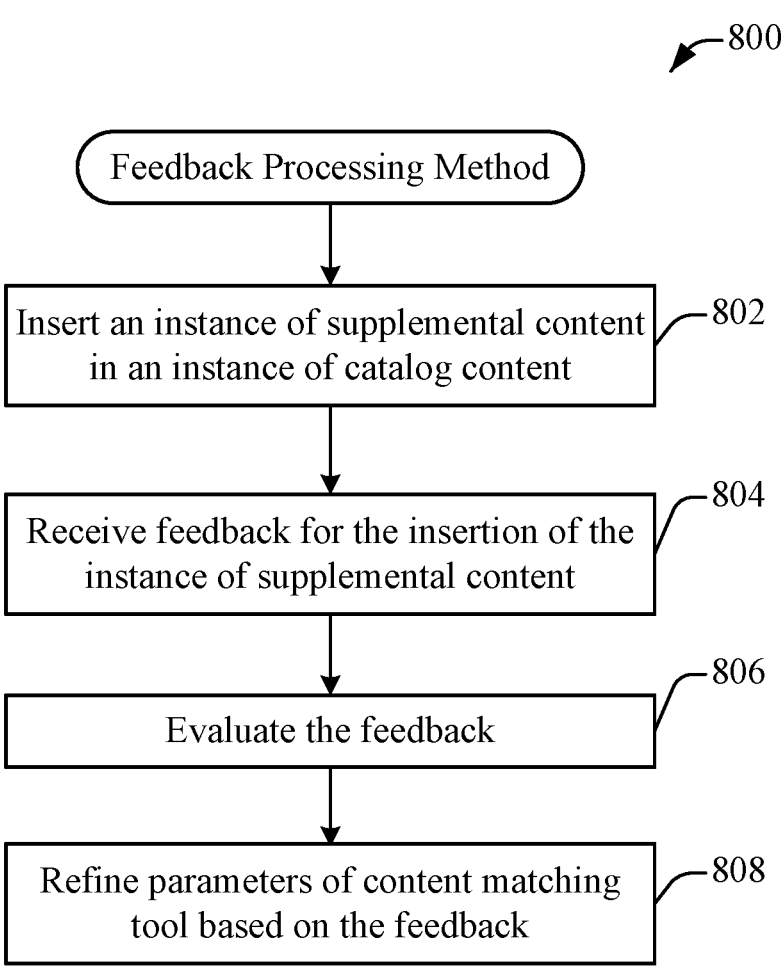
FIG. 8 depicts a simplified flowchart of a method for processing feedback according to some embodiments.

FIG. 8 depicts a simplified flowchart 800 of a method for processing feedback according to some embodiments. At 802, server system 102 may insert an instance of supplemental content during the delivery of an instance of catalog content. For example, during a break of playback of an instance of catalog content, supplemental content server 108 may select an instance of supplemental content to insert. Supplemental content server 108 may use different criteria to insert the instance of supplemental content. For example, as discussed above, different targeting rules, pacing requirements, or the labels may be used.

At 804, feedback system 212 receives feedback for the insertion of an instance of supplemental content. The feedback may be based on engagement with the instance of supplemental content when the instance of supplemental content is inserted into instances of catalog content. For example, the instance of supplemental content may be selected while the instance of supplemental content is displayed. Other feedback may include the viewing of the instance of supplemental content, purchasing a product or service that is offered, navigating to a website that is used to view a product, explicit feedback (e.g., like or do not like), etc. as described above in relation to feedback collection system 116.

At 806, feedback system 212 evaluates the feedback. For example, positive feedback may be received where engagement is received for the instance of supplemental content. Also, negative feedback may be received when a selection of the instance of supplemental content is not received when it is displayed. Other methods of determining positive and negative feedback may be appreciated.

Feedback system 212 may determine whether parameters of content matching tool 112 should be changed, such as parameters that are used to determine scores or the weights of weighting system 204. The feedback may be used to perform other refinements, such as adjusting pairing various terms in each taxonomy set beyond just which matches are similar or different. The feedback loop could draw new comparisons between specific terms in the taxonomy which could then change how recommendations are given. At 808, feedback system 212 refines the parameters of content matching tool 112 based on the feedback. For example, the weights may be changed. In some examples, if the feedback is positive, then weights may be changed to indicate that the labels for the instance of catalog content and the labels for the instance of supplemental content may result in positive feedback. This may result in higher scores for the labels when compared. In some examples, when a portion of the catalog content is a winter mountain skier, the feedback can be used to determine whether this portion provides a higher engagement with supplemental content from a travel site that depicts a tropical beach vacation or a holiday season winter cabin. The engagement may indicate which metadata should result in a higher match based on the engagement with a tropical beach vacation and a holiday season winter cabin. Comparisons could be made linking specific terms in the metadata categories that are proven to prompt high engagement when paired together. Also, using the feedback with this example, content matching tool 112 may look for contrasting metadata scores of key categories. For instance, the "events" metadata category surfaces the contrasting score, e.g., "winter" event in catalog content, surfaces lower or contrasting scoring match of "summer" vacation event in supplemental content.

Using content matching tool 112, different matches between instances of catalog content and instances of supplemental content may be determined. The robust metadata may be granular parameterized metadata that allows content matching tool 112 to explore many more combinations of labels between instances of supplemental content and instances of catalog content. This allows matches to be determined that may not have been found before, which is a significant improvement over finding obvious matching. Further, the use of weights may find matches that were not evident using a straight comparison. The use of feedback may enhance the evaluation of matches. The following are examples of matches that may be determined. In a first example, a portion of catalog content shows a doctor driving a car to visit an ailing animal. Metadata tags may include Genre: animal, nature; Mood: whimsical, heartwarming; Activity (and events): driving; Shot velocity: medium; and Color Palette: blues, browns, sepia. An instance of supplemental content may have similar labels in the Genre and Activity categories that may match the instance of supplemental content to the portion of catalog content. For example, an instance of supplemental content may show a dog driving a car. The dog driving a car may have the labels of animals, whimsical, driving, medium shot velocity, brown, gold, sepia. Here, the labels of driving, medium shot velocity, and brown color palette may be used to determine the match and result in higher scores that indicate a closer match, but other scoring formats may be used.

In a second example, a portion of a movie may include in the labels of Genre: musical; Mood: uplifting, wondrous; Activity: dancing; Shot velocity: medium; and Color palette: blue tones. An instance of supplemental content may be determined to match the instance of catalog content based on its mood, activity and color. For example, supplemental content about a perfume may include the labels of Genre: Musical; Mood: wondrous and romantic; Activity: dancing; Shot velocity: medium; and Color palette: brown, blue. Here, the mood of wondrous, the activity of dancing, and the color palette of blue may be used to determine the match.

In a third example, an instance of catalog content may reunite two characters with a hug. The labels for this instance of catalog content may be Genre: fantasy; Mood: whimsical, warm; Activity: hugging; Shot velocity: medium, and Color palette: brown tones. The instance of supplemental content may be based on a character hugging a tree. The labels for the instance of supplemental content may be Genre: nature; Mood: whimsical, warm; Activity:

hugging; Shot velocity: medium; and Color palette: brown. In this case, the mood may be similar and including whimsical and warm themes, the activity may be similar in depicting a hugging action, and the color palette may be similar with both brown tones.

Other examples may match instances of catalog content with instances of supplemental content based on the character, such as the same actress, the same shot velocity, the same type of location, such as library, the same type of activity, such as walking or driving, a similar type of event, such as a family meal. Also, contrasting matches may be determined, such as seasons may be winter and summer, or the scenery may be mountainous and beach, which offer contrasting themes.

CONCLUSION

Accordingly, content matching tool 112 uses granular metadata to perform improved matching of supplemental content and catalog content. The use of more granular metadata may improve the matches that are determined. The weighting of metadata categories also allows the matching process to be adjusted to provide better matches. Further, receiving feedback and the adjusting of parameters may improve the matches based on the feedback and explore non-obvious matches between instances of catalog content and supplemental content. The information may be provided in unique user interfaces that can be used to evaluate instances of catalog content and the relevancy to an instance of supplemental content.

System

Figure 9:
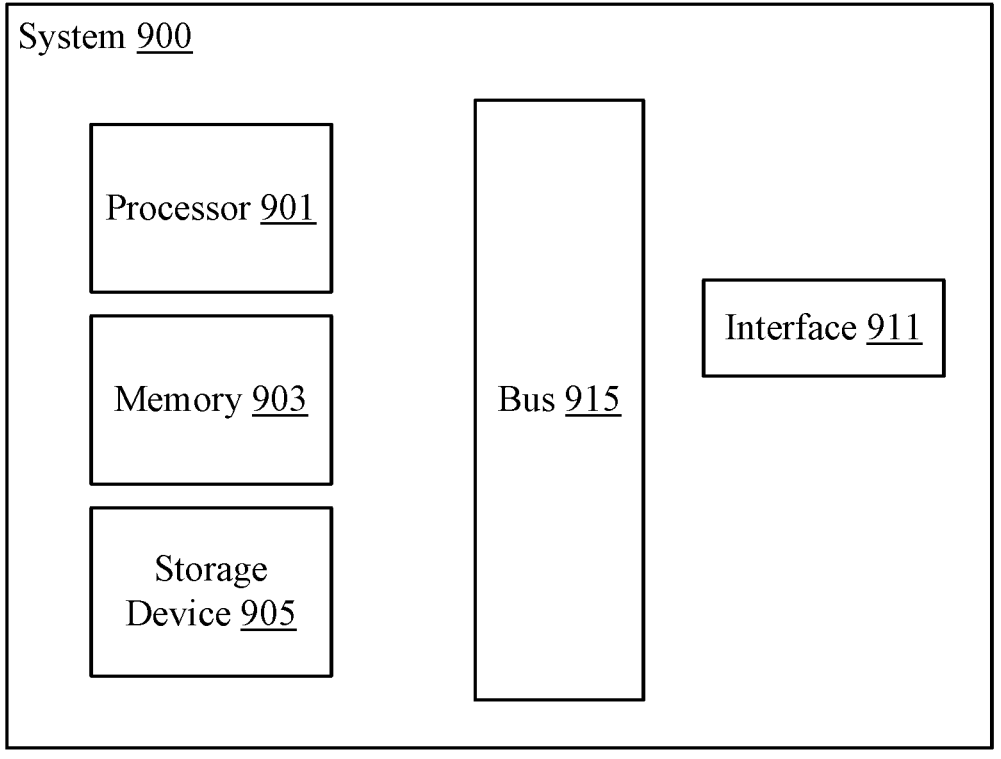
FIG. 9 illustrates one example of a computing device according to some embodiments.

FIG. 9 illustrates one example of a computing device according to some embodiments. According to various embodiments, a system 900 suitable for implementing embodiments described herein includes a processor 901, a memory module 903, a storage device 905, an interface 911, and a bus 915 (e.g., a PCI bus or other interconnection fabric.) System 900 may operate as a variety of devices such as server system 102, or any other device or service described herein. Although a particular configuration is described, a variety of alternative configurations are possible. The processor 901 may perform operations such as those described herein. Instructions for performing such operations may be embodied in the memory 903, on one or more non-transitory computer readable media, or on some other storage device. Various specially configured devices can also be used in place of or in addition to the processor 901. Memory 903 may be random access memory (RAM) or other dynamic storage devices. Storage device 905 may include a non-transitory computer-readable storage medium holding information, instructions, or some combination thereof, for example instructions that when executed by the processor 901, cause processor 901 to be configured or operable to perform one or more operations of a method as described herein. Bus 915 or other communication components may support communication of information within system 900. The interface 911 may be connected to bus 915 and be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by non-transitory computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Java, Python, C++, C. HTML, any other markup language, JavaScript, ActiveX, VBScript, or Perl. Examples of non-transitory computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A non-transitory computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured or operable to perform that which is described in some embodiments.

As used in the description herein and throughout the claims that follow, "a", "an", and "the" include plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments and are presented to illustrate the flexibility and advantages of some embodiments as defined by the following claims. Based on the above disclosure and the following claims, other arrangements, embodiments, implementations, and equivalents may be employed without departing from the scope hereof as defined by the claims.

What is claimed is:

1. A method comprising:

selecting an instance of first content and an instance of second content, wherein the instance of first content and the instance of second content are configured to be delivered to client devices;

determining a plurality of first labels for a plurality of categories for the instance of first content, wherein the plurality of first labels are based on an analysis of content of the instance of first content;

determining a plurality of second labels for the plurality of categories for the instance of second content, wherein the plurality of second labels are based on an analysis of content of the instance of second content;

comparing the plurality of first labels and the plurality of second labels to determine a plurality of scores for the plurality of first labels, wherein the plurality of scores is based on parameters of a matching tool that is configured to determine a match between instances of content;

using a weight of a category to adjust a score in the plurality of scores to generate an adjusted score, wherein the adjusted score is for the label that is determined for the category;

outputting information for the adjusted score and scores in the plurality of scores;

receiving feedback from delivering the instance of first content that is inserted into a break of the instance of second content, and using the feedback to adjust a parameter of the matching tool, wherein the parameter is used to determine scores for the plurality of categories.

2. The method of claim 1, further comprising:

extracting the plurality of first labels based on characteristics of the content of the instance of first content.

3. The method of claim 2, further comprising:

determining a plurality of portions of the instance of second content; and extracting the plurality of first labels based on characteristics of each of the portions of the instance of second content.

4. The method of claim 3, wherein comparing the plurality of first labels and the plurality of second labels comprises:

comparing the plurality of first labels for each respective portion in the plurality of portions and the plurality of second labels, wherein a plurality of scores is determined for each respective portion.

5. The method of claim 1, further comprising:

extracting the plurality of second labels based on characteristics of the content of the instance of second content.

6. The method of claim 1, wherein using the weight of the category comprises:

weighting a first label in the plurality of first labels based on an importance that is associated with the first label in the plurality of first labels.

7. The method of claim 6, further comprising:

adjusting a score for the first label based on the weight.

8. The method of claim 6, wherein;

a first weight for the first label in the plurality of first labels is increased, and a second weight for a second label in the plurality of first labels is decreased, wherein the first label is set as having a higher importance than the second label.

9. The method of claim 1, further comprising:

generating an overall score for the instance of second content based on the adjusted score and scores in the plurality of scores.

10. The method of claim 1, further comprising:
using the feedback to adjust the weight of the category.

11. The method of claim 10, wherein:
the weight is increased when the feedback is positive, and the weight is decreased when the feedback is negative.

12. The method of claim 1, wherein the information for the adjusted score and the scores in the plurality of scores rate a portion of content before the break to the instance of first content.

13. The method of claim 1, further comprising:
adjusting the weight of the category based on the plurality of scores.

14. The method of claim 1, wherein:
the instance of first content comprises an instance of supplemental content, and
the instance of second content comprises an instance of catalog content, wherein the instance of supplemental content is configured to be inserted in the instance of catalog content during playback of the instance of catalog content.

15. The method of claim 1, wherein outputting the information for the adjusted score and scores in the plurality of scores comprises:
generating a user interface that displays the adjusted score and scores in the plurality of scores.

16. The method of claim 1, wherein outputting the information for the adjusted score and scores in the plurality of scores comprises:
generating a user interface that displays the adjusted score and scores in the plurality of scores in a bar chart, wherein a length of a bar is based on a value of the adjusted score and the scores in the plurality of scores.

17. A non-transitory computer-readable storage medium having stored thereon computer executable instructions, which when executed by a computing device, cause the computing device to be operable for:
selecting an instance of first content and an instance of second content, wherein the instance of first content and the instance of second content are configured to be delivered to client devices;
determining a plurality of first labels for a plurality of categories for the instance of first content, wherein the plurality of first labels are based on an analysis of content of the instance of first content;
determining a plurality of second labels for the plurality of categories for the instance of second content, wherein the plurality of second labels are based on an analysis of content of the instance of second content;
comparing the plurality of first labels and the plurality of second labels to determine a plurality of scores for the plurality of first labels, wherein the plurality of scores is based on parameters of a matching tool that is configured to determine a match between instances of content;

using a weight of a category to adjust a score in the plurality of scores to generate an adjusted score, wherein the adjusted score is for the label that is determined for the category;
outputting information for the adjusted score and scores in the plurality of scores;
receiving feedback from delivering the instance of first content that is inserted into a break of the instance of second content; and
using the feedback to adjust a parameter of the matching tool, wherein the parameter is used to determine scores for the plurality of categories.

18. The non-transitory computer-readable storage medium of claim 17, further operable for:
extracting the plurality of first labels based on characteristics of the content of the instance of first content.

19. An apparatus comprising:
one or more computer processors; and
a computer-readable storage medium comprising instructions for controlling the one or more computer processors to be operable for:
selecting an instance of first content and an instance of second content, wherein the instance of first content and the instance of second content are configured to be delivered to client devices;
determining a plurality of first labels for a plurality of categories for the instance of first content, wherein the plurality of first labels are based on an analysis of content of the instance of first content;
determining a plurality of second labels for the plurality of categories for the instance of second content, wherein the plurality of second labels are based on an analysis of content of the instance of second content;
comparing the plurality of first labels and the plurality of second labels to determine a plurality of scores for the plurality of first labels, wherein the plurality of scores is based on parameters of a matching tool that is configured to determine a match between instances of content;
using a weight of a category to adjust a score in the plurality of scores to generate an adjusted score, wherein the adjusted score is for the label that is determined for the category;
outputting information for the adjusted score and scores in the plurality of scores;
receiving feedback from delivering the instance of first content that is inserted into a break of the instance of second content; and
using the feedback to adjust a parameter of the matching tool, wherein the parameter is used to determine scores for the plurality of categories.

20. The non-transitory computer-readable storage medium of claim 17, further operable for:
using the feedback to adjust the weight of the category.

* * * * *